US006839428B2

(12) United States Patent
Brower et al.

(10) Patent No.: US 6,839,428 B2
(45) Date of Patent: Jan. 4, 2005

(54) SEALED TERMINATING DEVICE

(75) Inventors: Boyd G. Brower, Keller, TX (US);
Steven E. Glenn, Euless, TX (US)

(73) Assignee: Corning Cable Systems LLC, Hickory, NC (US)

( * ) Notice: Subject to any disclaimer, the term of this patent is extended or adjusted under 35 U.S.C. 154(b) by 438 days.

(21) Appl. No.: 09/887,643

(22) Filed: Jun. 22, 2001

(65) Prior Publication Data

US 2002/0196933 A1 Dec. 26, 2002

(51) Int. Cl.[7] .............................. H04M 1/00; H04M 9/00
(52) U.S. Cl. .......................... 379/413.04; 379/413.02; 379/413.03; 379/413.01; 439/397; 439/409; 439/188; 439/646; 439/709; 439/869; 439/879
(58) Field of Search ........................ 379/413.01, 413.04, 379/402–404; 439/397, 409, 188, 678

(56) References Cited

U.S. PATENT DOCUMENTS

| | | | | |
|---|---|---|---|---|
| 4,793,822 A | * | 12/1988 | Cozzens et al. | ............ 439/397 |
| 5,450,469 A | * | 9/1995 | Pamart et al. | ......... 379/413.04 |
| 5,802,170 A | * | 9/1998 | Smith et al. | ........... 379/413.04 |
| 5,844,021 A | * | 12/1998 | Koblitz et al. | .............. 439/936 |
| 5,888,085 A | * | 3/1999 | Meyerhoefer et al. | ...... 439/188 |
| 5,993,243 A | * | 11/1999 | Daoud | ........................ 439/409 |
| 5,993,264 A | * | 11/1999 | Daoud | ................... 379/413.04 |
| 5,993,265 A | * | 11/1999 | Daoud | ................... 379/413.04 |
| 6,022,233 A | * | 2/2000 | Daoud | ................... 379/413.04 |
| 6,340,306 B1 | * | 1/2002 | Daoud | ........................ 439/219 |

* cited by examiner

*Primary Examiner*—Forester W. Isen
*Assistant Examiner*—Ramnandan Singh
(74) *Attorney, Agent, or Firm*—Christopher C. Dremann

(57) ABSTRACT

A terminating device for interconnecting service provider wiring with subscriber wiring includes a base, a customer bridge, a removable cover and insulation displacement contacts for terminating the service provider wiring and the subscriber wiring. The insulation displacement contacts for the subscriber wiring are housed within the customer bridge and terminate the subscriber wiring by moving an actuating arm from a disconnected position to a connected position. The insulation displacement contacts for the service provider wiring terminate the service provider wiring by moving a stuffer from a disconnected position to a connected position. The cover includes a locking slide having a movable clasp for deterring unauthorized access to the customer bridge, while permitting authorized access. A plug on the cover and a jack on the base each have a resilient seal that telescope together to effectively seal test contacts located within the jack when the plug is inserted into the jack.

34 Claims, 10 Drawing Sheets

SEALED TERMINATING DEVICE

BACKGROUND OF THE INVENTION

1. Field of the Invention

The present invention relates to a terminating device for use in a communications network to interconnect service provider wiring with subscriber wiring. More specifically, the invention relates to a terminating device that is sealed to protect the wiring connections from a flood condition.

2. Background of the Invention

A communications service provider, such as a telephone company, may offer both voice and data transmission services over a communications network. Customers of the service provider, commonly referred to as "subscribers," may purchase as many communications services as they desire and equip their homes, businesses, or the like with equipment to utilize such services. Subscribers are responsible for proper operation of the equipment and the service provider is responsible for proper operation of the communications network up to the interface, commonly referred to as the "demarcation point," between the service provider wiring and the subscriber wiring. The demarcation point is accessible to both the subscriber and the service provider and is typically located at a subscriber site in a network interface device (NID) or a building entrance terminal (BET) that is mounted on the exterior wall of an office, apartment, commercial, or residential building, a home, or the like.

As shown in FIG. 1, a NID 12 may be mounted on an exterior wall at a subscriber site 10. Both service provider wiring 14 and subscriber wiring 16 enter the NID 12. At least one terminating device for interconnecting the service provider wiring 14 with the subscriber wiring 16 is housed within the NID 12. The NID 12 may also include at least one protection element for protecting the subscriber's equipment from voltage or current surges carried over the communications network. When the protection element is configured within the NID 12 separate from the terminating device, the terminating device is commonly referred to as a line module. When the protection element is configured within the NID 12 in conjunction with the terminating device, the terminating device is commonly referred to as a protected terminating device (PTD). As used herein, "terminating device" is intended to include any type of apparatus or device for interconnecting service provider wiring with subscriber wiring, configured with or without a protection element, including but not limited to a line module, a PTD, or the like.

Unprotected terminating devices may fail when subjected to a voltage or current surge. When a terminating device fails, the subscriber is no longer able to access the communications network. Further, the service provider must dispatch a technician to the subscriber site to repair or replace the terminating device at significant expense to the service provider. A terminating device may also fail when exposed to moisture for an extended period of time. For example, as illustrated in FIG. 1, the NID 12 may be partially or completely submerged under water 18 during a flood condition. The NID 12, however, is typically not watertight because it must be provided with openings to allow for entry of the service provider wiring 14 and the subscriber wiring 16. As a result, the terminating device housed within the NED 12 may also be partially or completely submerged during the flood condition. Thus, a need exists for a terminating device than can withstand extended periods of submersion in water and yet still remain functional.

SUMMARY OF THE INVENTION

The present invention relates to a sealed terminating device for interconnecting service provider wiring with subscriber wiring that remains functional following an extended period of submersion in water, such as during a flood condition.

In one embodiment, the invention is a terminating device including a base, a customer bridge attached to the base, and a stuffer assembly mounted to the base. The customer bridge houses at least one insulation displacement contact and has at least one wire insertion hole formed therein for electrically connecting the subscriber wiring to the terminating device. The stuffer assembly has at least one insulation displacement contact for electrically connecting the service provider wiring to the terminating device.

In another embodiment, the invention is a terminating device including a base, a customer bridge attached to the base, and a cover attached to the customer bridge. The customer bridge houses at least one insulation displacement contact and has at least one wire insertion hole formed therein for electrically connecting the subscriber wiring to the terminating device. The cover is movable between a closed position and an opened position and includes a locking slide having a movable clasp.

In yet another embodiment, the invention is a device for terminating service provider wiring and subscriber wiring. The device includes a base, a stuffer assembly mounted to the base, a customer bridge attached to the base, and a cover attached to the customer bridge that is movable between a closed position and an opened position. The stuffer assembly has at least one insulation displacement contact for terminating the service provider wiring to the device. The customer bridge houses at least one insulation displacement contact and has at least one wire insertion hole formed therein for terminating the subscriber wiring to the device.

In yet another embodiment the invention is a NID for use in a communications network. The NID includes a line module for interconnecting service provider wiring with subscriber wiring. The line module includes a base, a stuffer assembly mounted to the base, a customer bridge attached to the base, and a cover attached to the customer bridge for movement between an opened position and a closed position. The stuffer assembly includes at least one insulation displacement contact for terminating the service provider wiring. At least one insulation displacement contact is housed within the customer bridge for terminating the subscriber wiring.

BRIEF DESCRIPTION OF THE DRAWINGS

The accompanying drawings, which are incorporated in and constitute a part of this specification, illustrate one or more embodiments of the invention described more fully below and together with the following detailed description, serve to further explain the invention. In the drawings:

FIG. 1 is an environmental view of a prior art NID mounted on the exterior wall of an office, apartment, commercial, or residential building, a home, or the like;

DETAILED DESCRIPTION OF THE INVENTION

Figure 1:
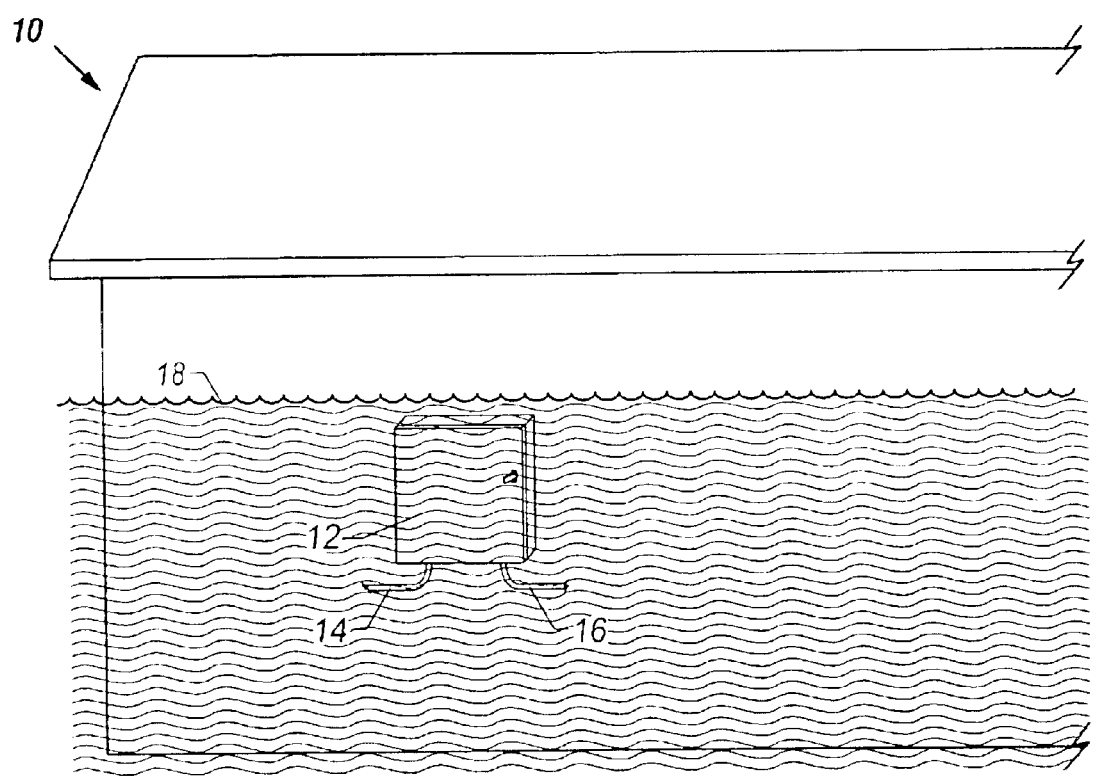
Figure 2:
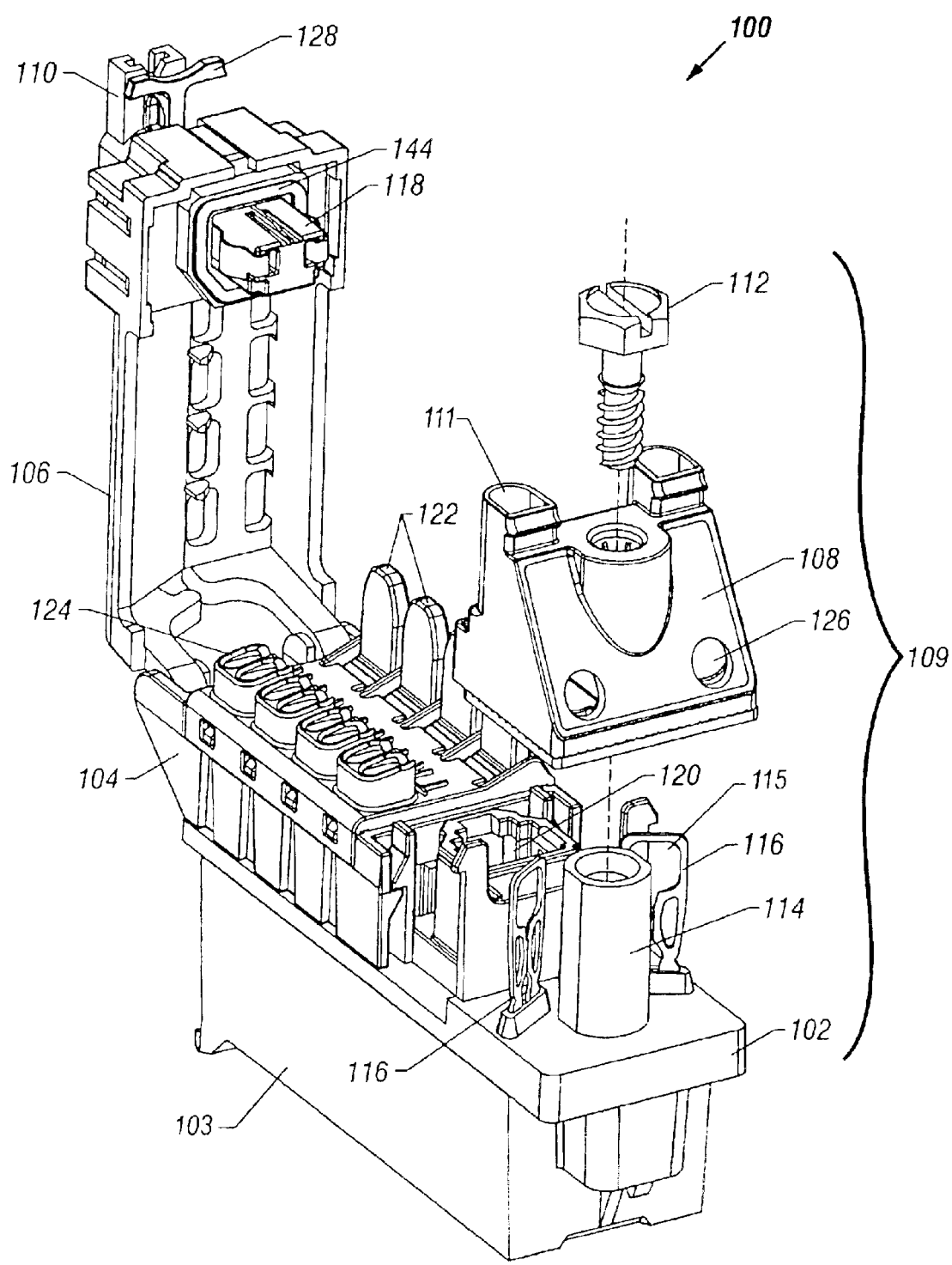
FIG. 2 is a perspective view of a terminating device according to the invention shown with the cover in the opened position and the stuffer assembly exploded for purposes of clarity.

The invention relates to a terminating device for interconnecting service provider wiring 14 with subscriber wiring 16 (FIG. 1). A terminating device 100 constructed in accordance with the invention is shown in FIG. 2. The terminating device 100 may be any apparatus or device for interconnecting service provider wiring 14 with subscriber wiring 16, such as a line module, PTD, or the like. For purposes of example only and not for limitation, the terminating device shown and described herein is a line module 100 that is housed within a NID 12 (FIG. 3) to serve as a demarcation point between the service provider wiring 14 and the subscriber wiring 16 in a telecommunications network. The line module 100 includes a base 102 and a customer bridge 104 mounted on the base. The base 102 is positioned over and attached to a generally hollow electronics module 103 that may contain electronic circuitry, such as a printed circuit board or a telephone half-ringer. In another embodiment, the electronics module 103 may contain a protection element, such as a gas tube, varistor, or the like, for protecting the subscriber's equipment from a voltage or current surge carried by the communications network. The electronics module 103 may contain the protection element in place of or in addition to the electronic circuitry. In either instance, the terminating device including the protection element is commonly referred to as a PTD, a protection device, or a protector.

The customer bridge 104 includes a cover 106 that is movable between a first, opened position, shown in FIG. 2, and a second, closed position. The cover 106 is provided with a plug 118 that engages a jack 120 formed on the upper surface of the base 102 when the cover is in the closed position. The jack 120 has test contacts disposed thereon that engage the contacts of an RJ-11 plug of a conventional telephone handset in a known manner to test for the presence of a telephone "dial tone" on the communications network. Since the NID 12 is typically mounted on an exterior wall of an office, apartment, commercial, or residential building, a home, or the like, the line module 100 is susceptible to access by individuals that are not authorized to utilize the telephone service. As will be described in greater detail hereinafter, the terminating device of the invention deters the theft of telephone service by unauthorized individuals and protects the communications network and the subscriber's equipment from damage caused by excessive moisture, such as a flood condition.

The customer bridge 104 houses at least one insulation displacement contact (not shown) and a corresponding actuating arm 122 for electrically connecting the subscriber wiring to the insulation displacement contact, and thus, to the terminating device. In operation, the actuating arm 122 is placed in the "disconnect" position (FIG. 7) and the subscriber wiring (not shown) is inserted into the wire insertion hole 124 of the corresponding insulation displacement contact. The actuating arm 122 is then moved from the "disconnect" position to the "connect" position (FIG. 7) to force the subscriber wiring into engagement with the insulation displacement contact and thereby electrically connect the subscriber wiring to the customer bridge 104 of the line module 100. Although the operation of only a single actuating arm 122, insulation displacement contact and wire insertion hole 124 has been described herein, the customer bridge 104 may be provided with any number of wire insertion holes 124, insulation displacement contacts and corresponding actuating arms 122. As shown herein, the customer bridge 104 has a plurality, and more specifically four, pairs of wire insertion holes 124 and insulation displacement contacts, each pair corresponding to one of the four actuating arms 122. Accordingly, the customer bridge 104 may accommodate, for example, up to four twisted pair tip and ring wires from various subscriber telephone equipment. As one of ordinary skill in the art will readily understand and appreciate, two or more conductive members (not shown) are provided to electrically connect the insulation displacement contacts housed within the customer bridge 104 to corresponding subscriber tip and ring conductors disposed within the jack 120 formed in the base 102.

The base 102 is similarly provided with at least one insulation displacement contact 116 and a stuffer assembly 109 for electrically connecting the service provider wiring to the line module 100. As is well known, each insulation displacement contact 116 has a pair of opposed, sharp edges for piercing any insulation that may be present on the service provider wiring. The stuffer assembly 109, shown exploded in FIG. 2, includes a conventional stuffer 108 and stuffer screw 112 that cooperate to force the service provider wiring (not shown) into engagement with the insulation displacement contact 116, as will be described. The stuffer 108 is positioned for vertical movement on a post 114 that is internally threaded for receiving the externally threaded stuffer screw 112. The stuffer 108 further has a test port 111 formed therein for receiving a test clip to verify the integrity of the electrical connection between the service provider wiring and the insulation displacement contact 116.

In operation, the service provider wiring is inserted into horizontally disposed wire insertion passages 126 formed in the stuffer 108 and though an opening 115 formed in the upper portion of the insulation displacement contact 116. The external threads of the stuffer screw 112 engage the internal threads of the post 114 to drive the stuffer 108 downwardly against the service provider wiring positioned in the opening 115. As a result, the service provider wiring is brought into engagement with the opposed, sharp edges of the insulation displacement contact 116, thereby piercing any insulation surrounding the service provider wiring and electrically connecting the service provider wiring to the line module 100. As one of ordinary skill in the art will readily understand and appreciate, two conductive members (not shown) are provided to electrically connect the insulation displacement contacts 116 to corresponding service provider tip and ring conductors disposed within the jack 120 formed in the base 102. Accordingly, the insulation displacement contacts housed within the customer bridge 104 may be electrically connected to the insulation displacement contacts 116 by engaging the subscriber conductors and service provider conductors disposed in the jack 120, and thereby selectively interconnect the service provider wiring with the subscriber wiring.

Figure 3:
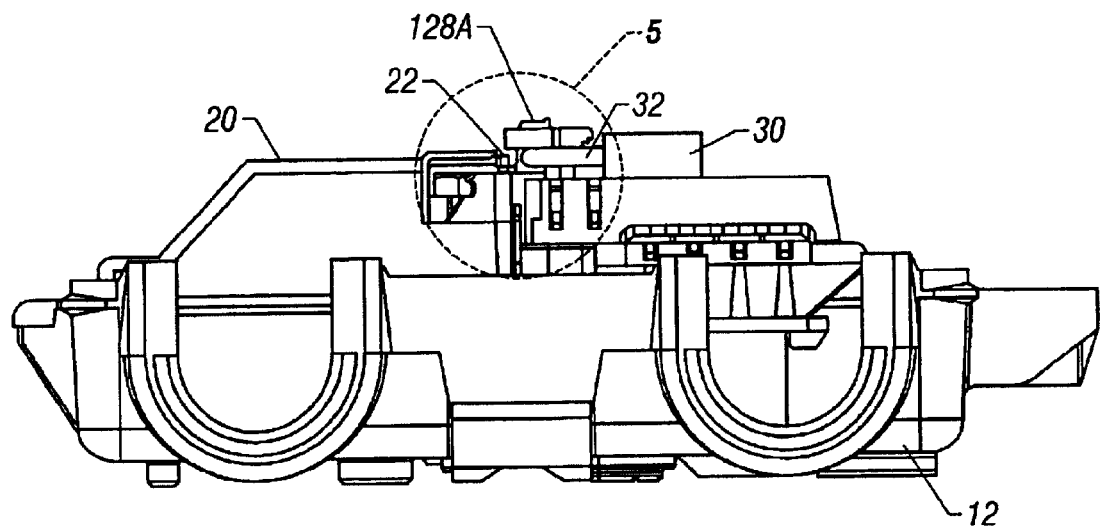
FIG. 3 is a bottom end view of a NID having the terminating device of FIG. 2 housed therein and shown with the outer cover of the NID removed for purposes of clarity.
Figure 5:
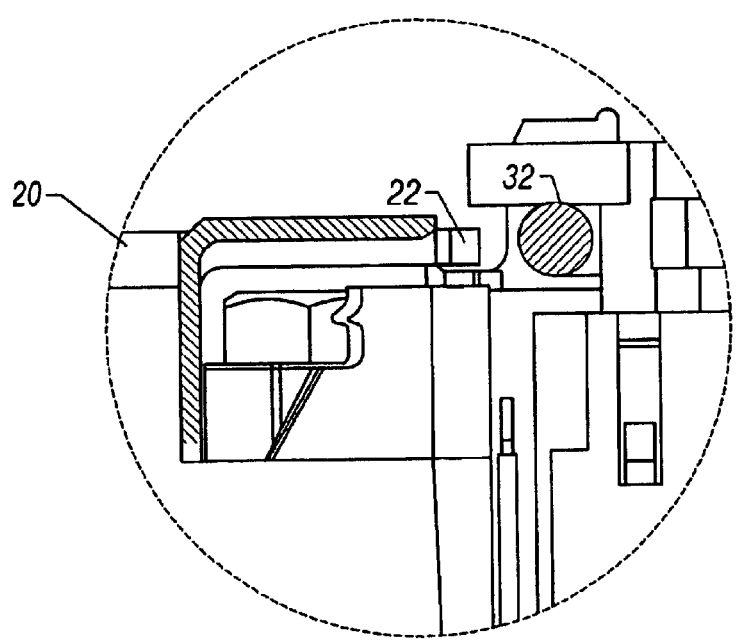
FIG. 5 is an enlarged detail view taken from FIG. 3 illustrating the closed and locked position of the cover of the terminating device and the inner cover of the NID.
Figure 4:
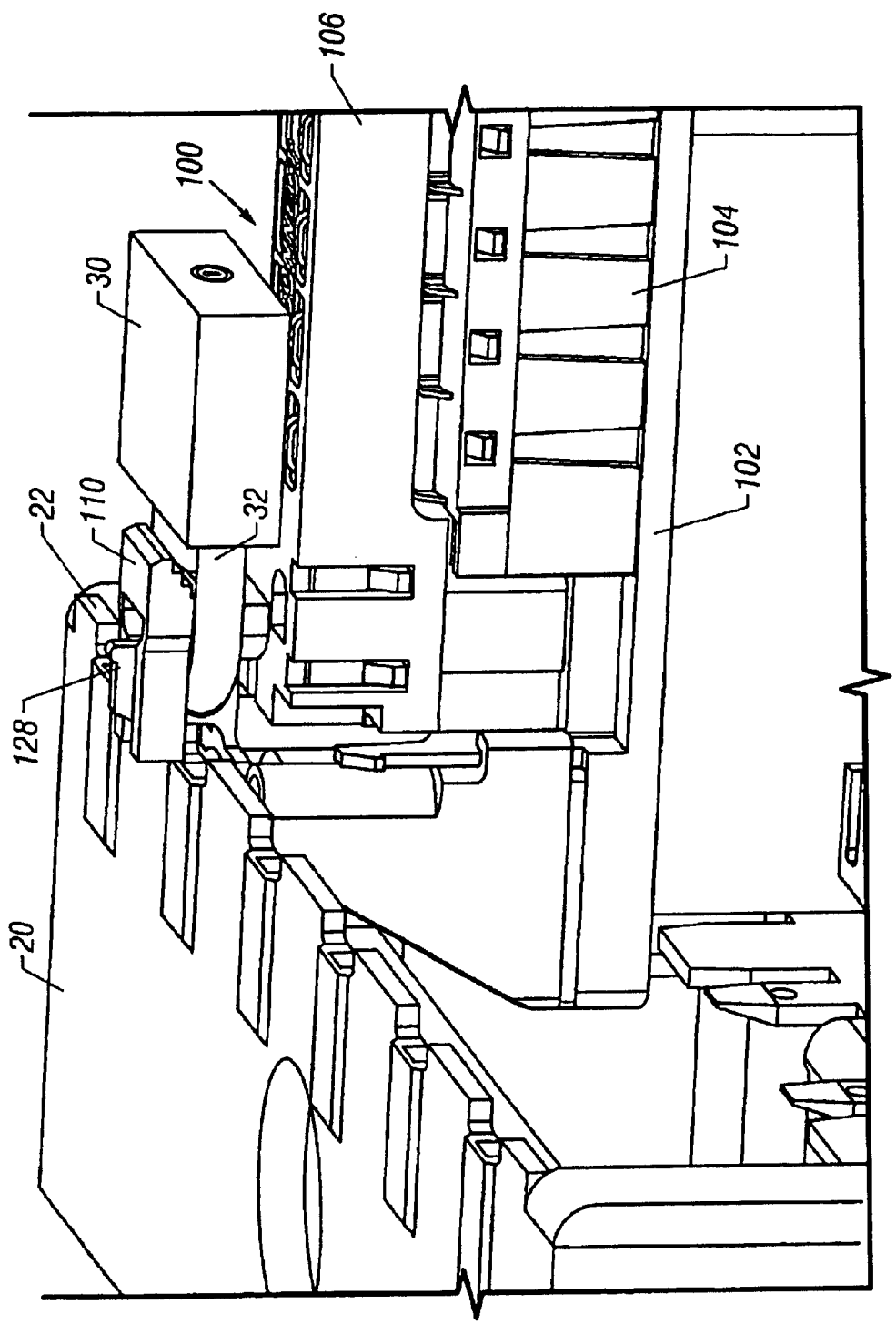
FIG. 4 is an enlarged perspective view of the interior of the NID of FIG. 3 illustrating the subscriber lock for deterring unauthorized access to the terminating device.

The cover 106 is equipped with a locking slide 110 that incorporates a movable clasp 128. The clasp 128 (FIG. 8) has a concave leading edge for cooperating with a subscriber lock 30 (FIG. 3). FIGS. 3–5 illustrate the interaction between the inner cover 20 of a conventional NID 12 and the line module 100, and more specifically, the interaction between the inner cover 20 of the NID 12, the movable clasp 128 of the line module 100, and the subscriber lock 30. The subscriber lock 30 deters unauthorized access to the line module 100, while permitting the subscriber and a craftsperson from the service provider to open the cover 106 of the line module 100 to access the actuating arms 122 that connect and disconnect the subscriber wiring with the insulation displacement contacts housed within the customer bridge 104. The craftsperson must still be able to open the cover 106 of the line module 100 for purposes of testing the electrical connections between the subscriber wiring and the customer bridge 104 even if dispatched when the subscriber is not at the customer site. As best shown in FIG. 5, the lip 22 of the inner cover 20 overlies and closely abuts the clasp 128. The lip 22 prevents substantial lateral movement of the clasp 128. However, once the inner cover 20 is opened, the lip 22 no longer overlies and closely abuts the clasp 128. Accordingly, the cover 106 may be opened with the locking arm 32 of the subscriber lock 30 captured within the clasp 128.

Figure 6A:
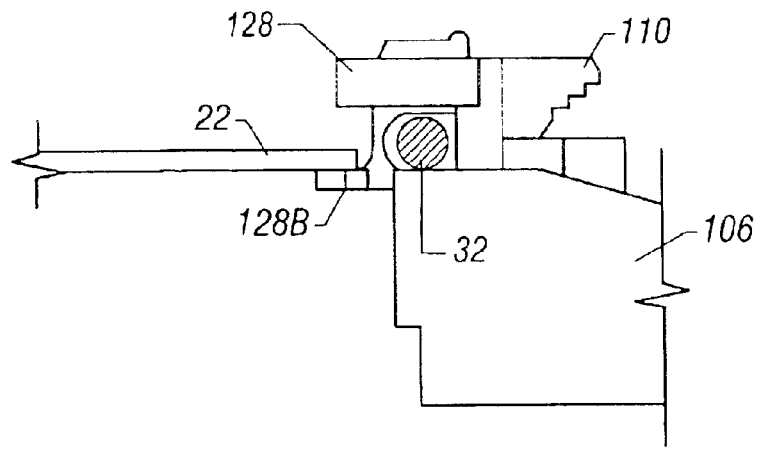
FIG. 6A illustrates the position of the cover of the terminating device relative to the inner cover of the NID with the subscriber lock in place.
Figure 6B:
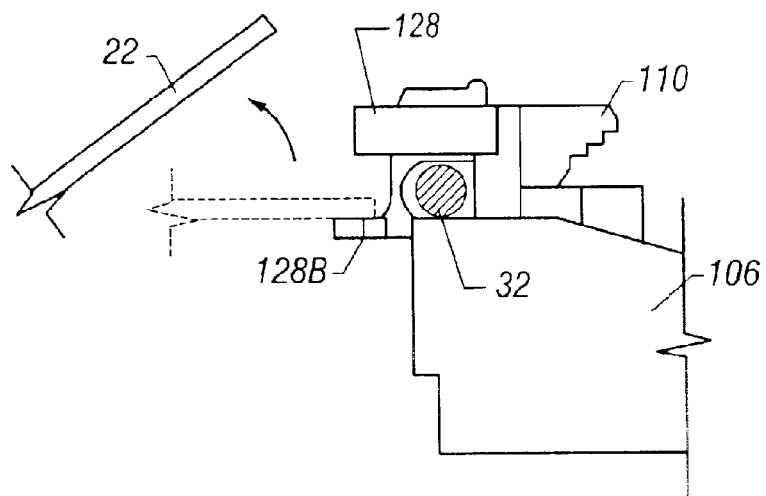
FIG. 6B illustrates the steps required for the service provider to open the cover of the terminating device with the subscriber lock in place.
Figure 6C:
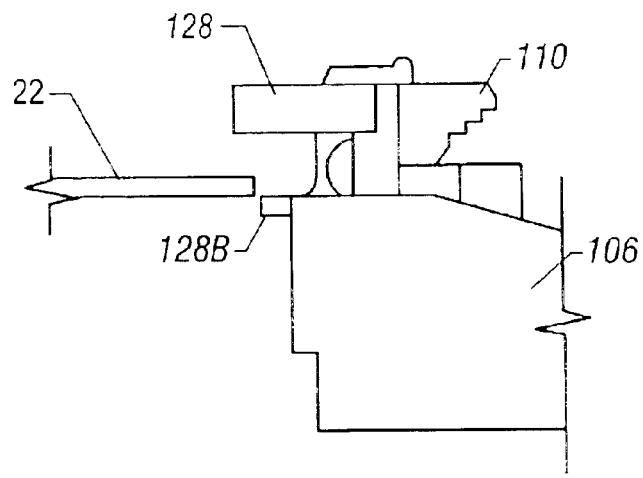
FIG. 6C illustrates the steps required for the subscriber to open the cover of the terminating device with the inner cover of the NID locked and the subscriber lock removed.

The interaction between the lip 22 of the inner cover 20 of the NID 12, the clasp 128 and the cover 106 of the line module 100 is illustrated in FIGS. 6A, 6B, and 6C. As discussed above, the locking arm 32 of a subscriber lock 30 may be captured within the clasp 128. The clasp 128 may then be positioned as shown in FIG. 6A. In this position, the cover 106 cannot be opened because the clasp 128 has a lower portion 128B that is captured beneath the lip 22. In a NID 12 servicing multiple subscribers at the same site, such as an apartment or commercial building, an unauthorized person may attempt to open the cover 106 of the line module 100 to steal communications service. Once the cover 106 of the line module 100 is opened, the unauthorized person can insert the RJ-11 plug of a conventional telephone handset into the jack 120 formed in the base 102 and utilize the communications service. The subscriber lock 30 deters unauthorized use of the communications service. In the event that an unauthorized person forces open the cover 106 of the line module 100, the lower portion 128B of the clasp 128 will be broken off. The damage to the lower portion 128B of the clasp 128 provides a visual indication that an unauthorized person has attempted to gain access to the customer bridge 104 of the line module 100.

If a craftsperson dispatched by the service provider needs to gain access to the customer bridge 104 of the line module 100, he will be able to open the inner cover 20 using a special tool that is typically available only to authorized personnel. As shown in FIG. 6B, opening the inner cover 20 removes the lip 22 from a position overlying the clasp 128. The cover 106 of the line module 100 can then be opened because the clasp 128 and the locking arm 32 of the subscriber lock 30 are affixed to and move with the cover 106. Alternatively, the subscriber or a person authorized by the subscriber can remove the subscriber lock 30, as shown in FIG. 6C, and the cover 106 can be opened with the inner cover 20 of the NID 12 locked and the lip 22 in place.

Figure 7:
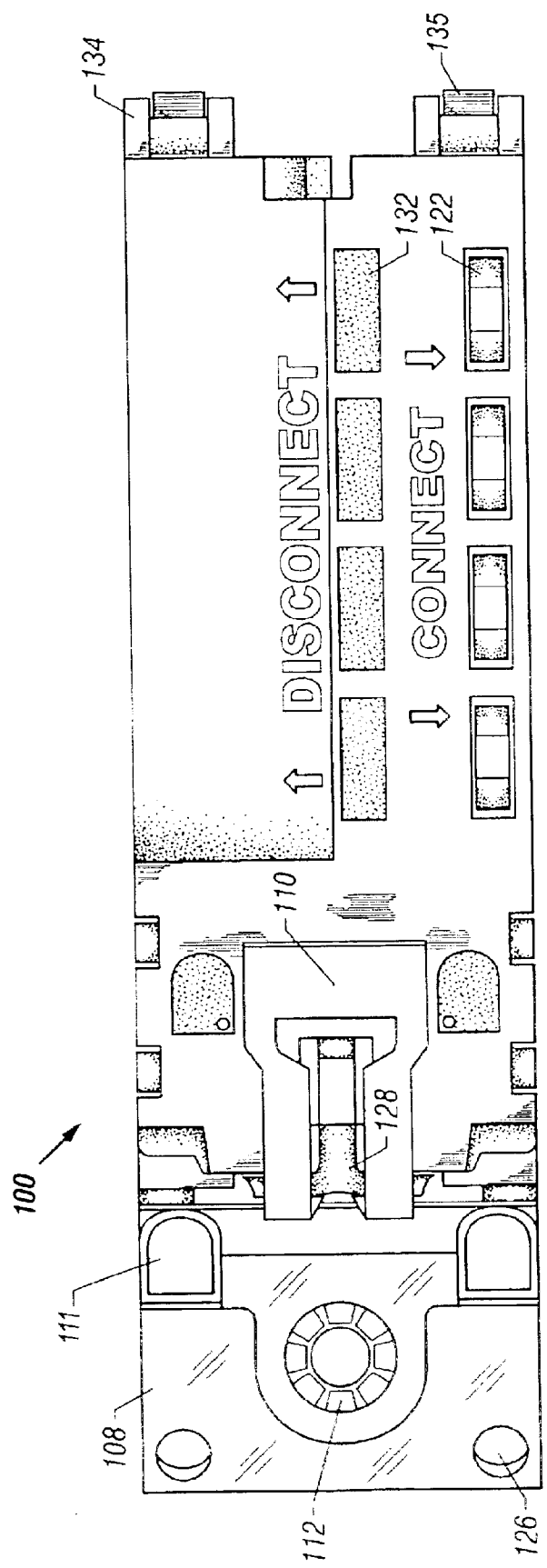
FIG. 7 is a top view of the terminating device.

FIG. 7 provides a top view of the line module 100. A hinge 134 provided on the customer bridge 104 cooperates with hinge arms 135 provided on the cover 106 to hingedly attach the cover to the customer bridge. The stuffer 108 of the stuffer assembly 109 is shown to the immediate left of the locking slide 110 and the movable clasp 128. The stuffer 108 must move from an extended, or disconnected, position to a retracted, or connected, position to engage the service provider wiring with the insulation displacement contacts 116. In the disconnected position, the stuffer 108 must not interfere with the clasp 128 or the lip 22 of the inner cover 20 (see FIG. 6A). As previously described, the stuffer screw 112 is used to move the stuffer 108 between the disconnected and the connected positions. The lip 22 of the inner cover 20 rests slightly above the stuffer 108. The stuffer 108 may have an angled surface to permit a craftsperson dispatched by the service provider to insert the service provider wiring into the wire insertion passages 126. The actuating arms 122 can easily be accessed and moved between the disconnected position and the connected position (as shown). Slots 132 are formed through the cover 106 to receive the actuating arms 122 and thereby provide a visual indication of the status of the subscriber wiring. As previously described, four actuating arms 122 are shown. However, this is merely an embodiment of the present invention and is not intended to limit or prescribe the number or location of wire insertion holes 124 (not shown), actuating arms 122, or insulation displacement contacts (not shown) housed within the customer bridge 104 of the line module 100.

Figure 8:
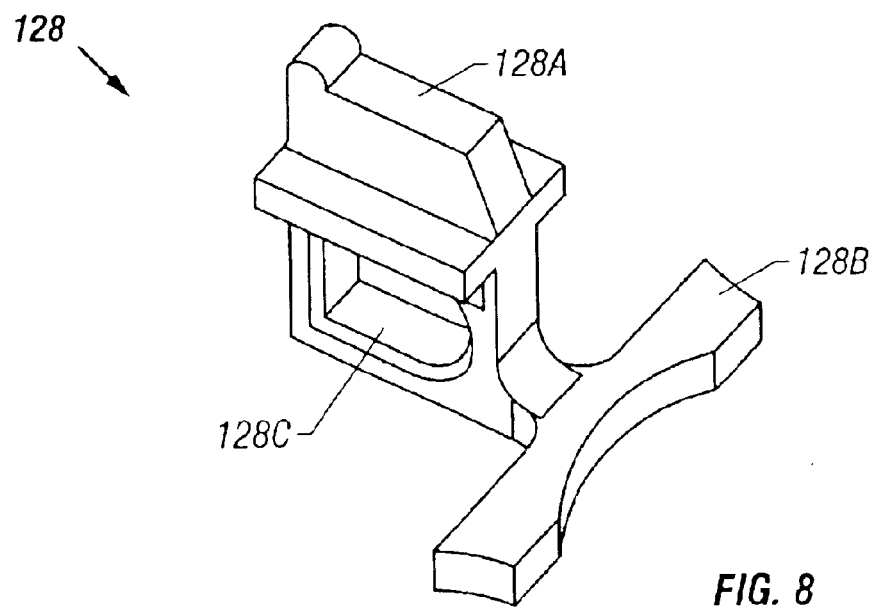
FIG. 8 is an enlarged perspective view of the locking slide of the terminating device.
Figure 9:
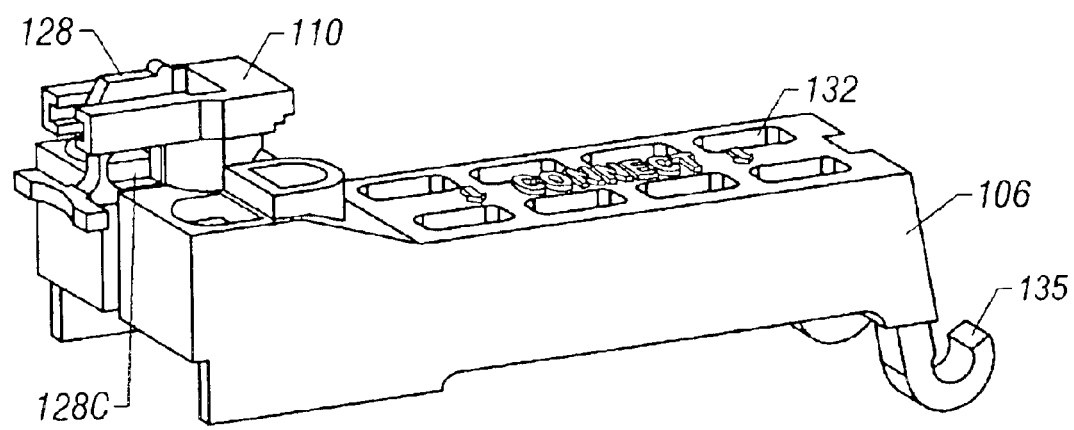
FIG. 9 is a perspective view of the removable cover of the terminating device.

FIG. 8 is a more detailed perspective view of the movable clasp 128 and FIG. 9 is a more detailed perspective view of the removable cover 106. As discussed above, the clasp 128 is slidably captured within the locking slide 110. The locking slide 110 is preferably integrally formed with the cover 106. The clasp 128 has an upper surface 128A that is shaped and dimensioned to engage a user's fingertip. As previously described, the clasp 128 also has a lower portion 128B that is generally planar and relatively thin. The lower portion 128B is relatively thin so as to fit comfortably between the lip 22 of the inner cover 20 and the stuffer 108 of the stuffer assembly 109 within the NID 12. The shape of the lower portion 128B provides sufficient surface area to ensure adequate contact with lip 22 of inner cover 20. Further, the attachment point between the lower portion 128B and the rest of the clasp 128 is sufficiently small such that the lower portion 128B will snap off if an unauthorized person attempts to gain access to the line module 100 by forcing open the cover 106. Damage to the lower portion 128B of the clasp 128 provides a visual indication that an unauthorized person has attempted to gain access to the line module 100. The clasp 128 also has an opening 128C for receiving the locking arm 32 of the subscriber lock 30 or a similar locking device to permit the subscriber to limit access to the line module 100 to authorized persons.

Figure 10:
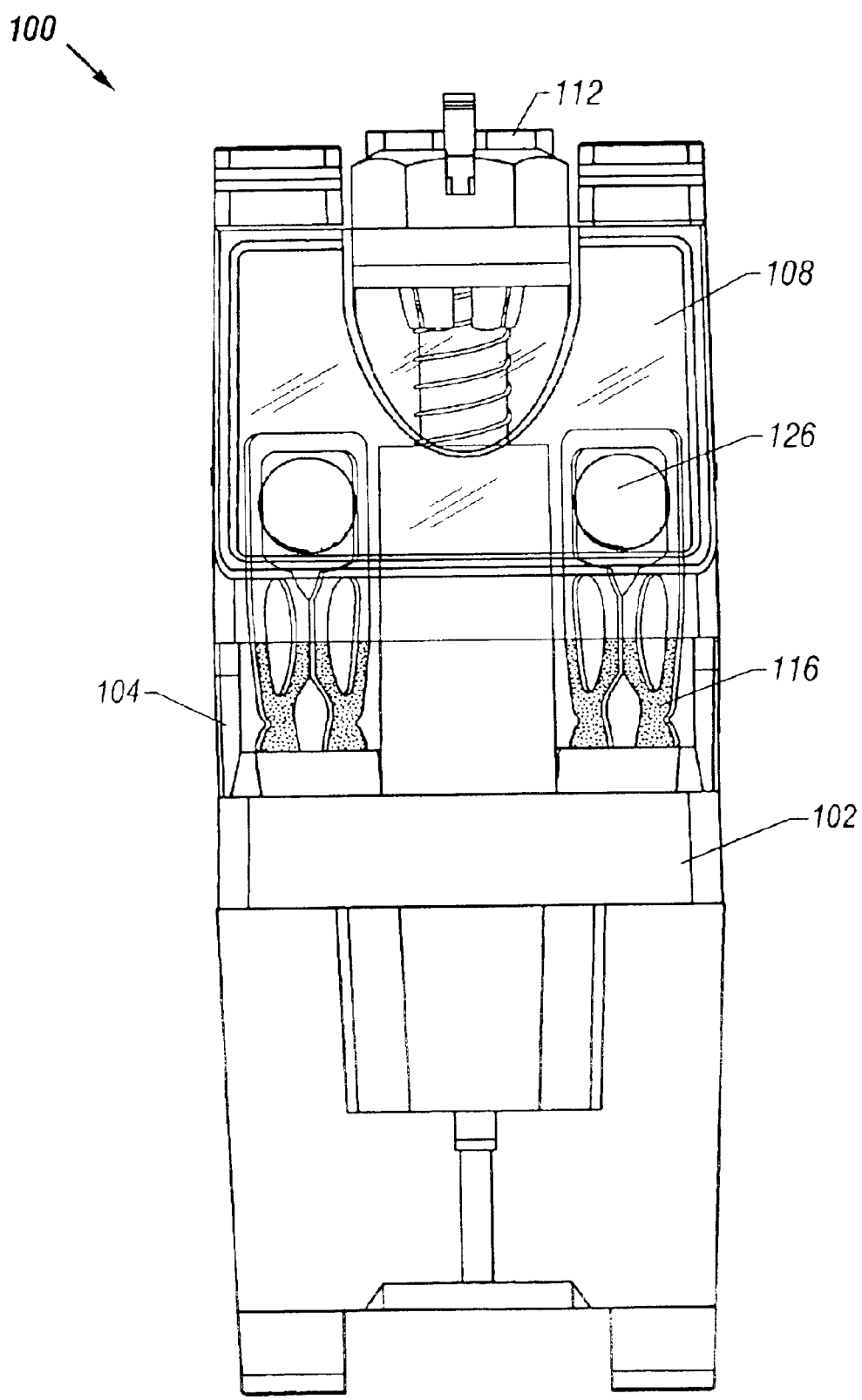
FIG. 10 is an end view of the terminating device shown with the stuffer in the extended, or disconnected, position for receiving the service provider wiring in the wire insertion passages.
Figure 11:
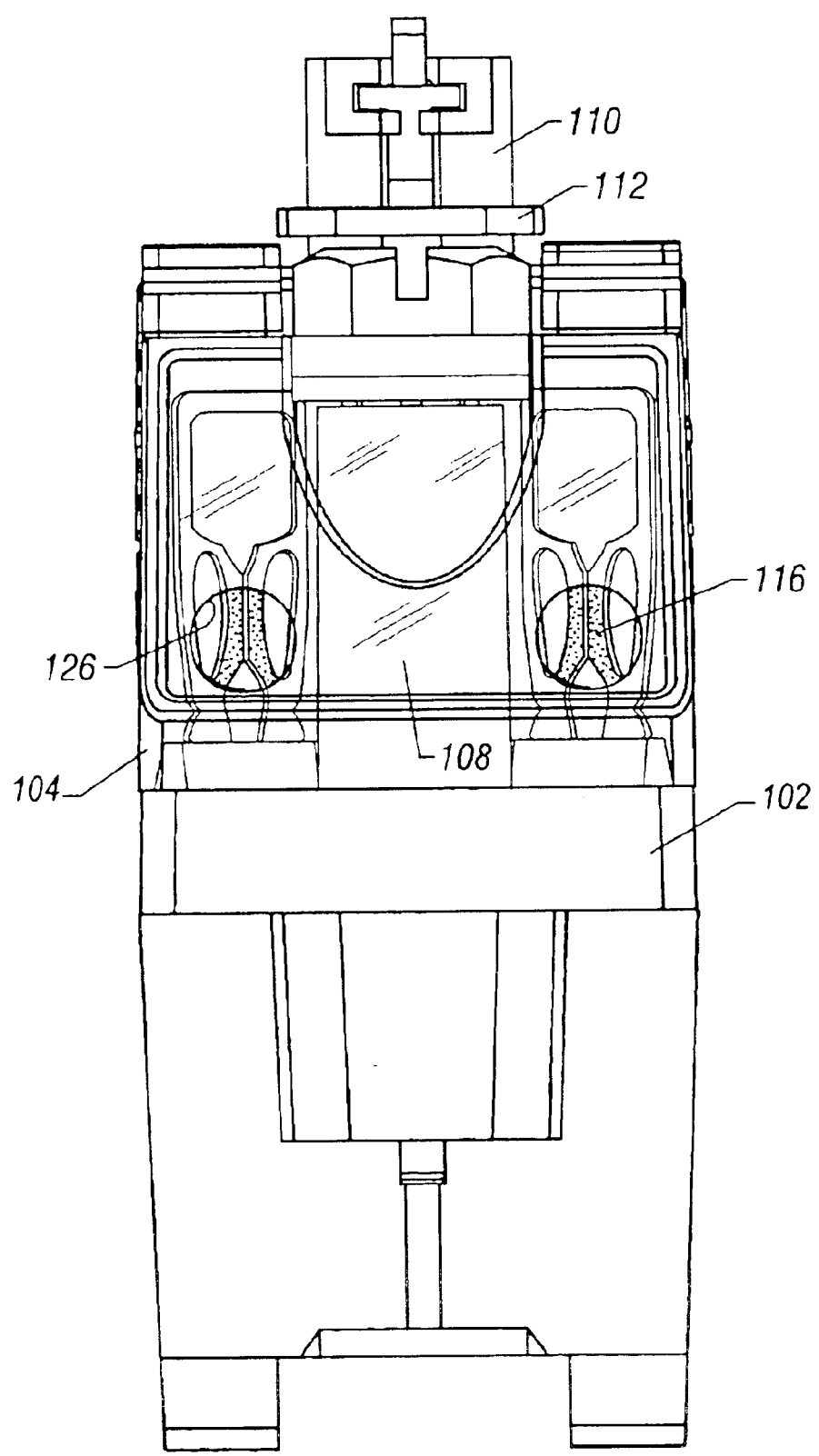
FIG. 11 is an end view of the terminating device shown with the stuffer in the retracted, or connected, position for electrically connecting the service provider wiring with the terminating device.

The stuffer 108 of the stuffer assembly 109 is better shown in FIGS. 10 and 11. The stuffer 108 forces service provider twisted pair tip and ring wires inserted into wire insertion passages 126 between the opposed, sharp edges of the insulation displacement contacts 116, piercing any insulation on the service provider wiring, and thereby electrically connecting the service provider wiring to the line module 100. Openings 115 in the upper portion of the insulation displacement contacts 116 generally align with the wire insertion passages 126 when the stuffer 108 is in the disconnected position. The service provider wiring is advanced into the wire insertion passages 126 so that the ends of the wiring extend through the openings 115 in the insulation displacement contacts 116. The stuffer screw 112 is then rotated clockwise to drive the stuffer 108 downward to the connected position shown in FIG. 11. The service provider wiring is forced between the opposed, sharp edges of the insulation displacement contacts 116. The sharp edges cut through any insulation on the service provider wiring and contact the conductive wires to establish an electrical connection between the service provider wiring and the line module 100.

Figure 12:
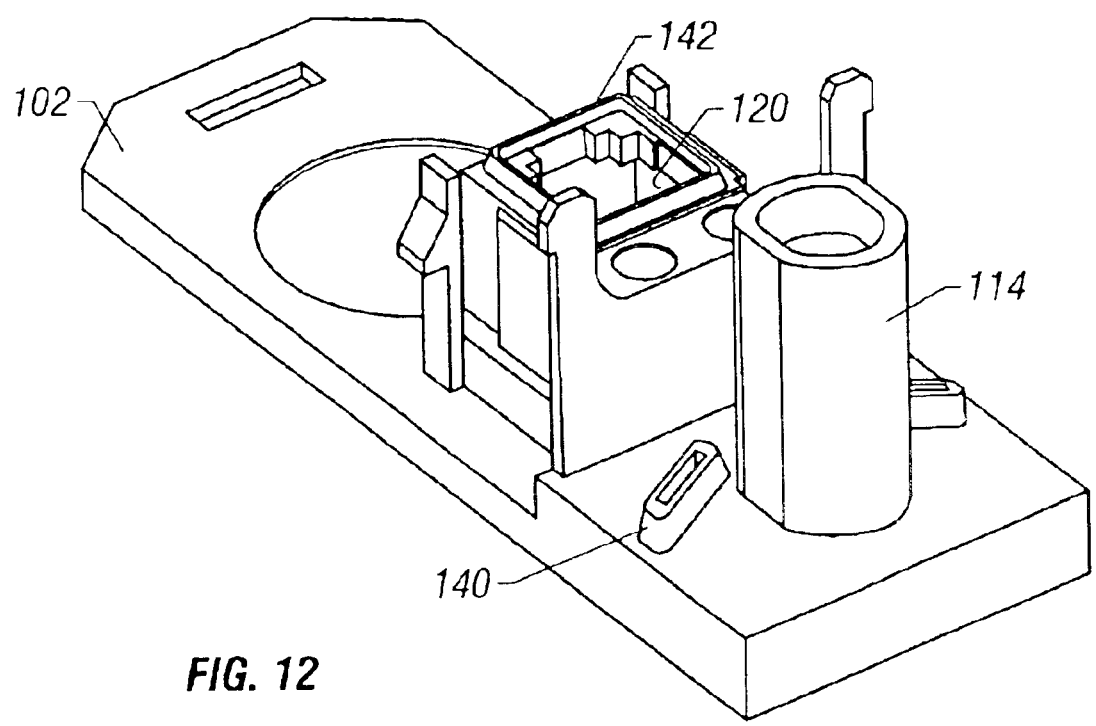
FIG. 12 is a perspective view of the base of the terminating device shown with the cover, the customer bridge, and the stuffer assembly removed for purposes of clarity.

The base 102 of the line module 100 is shown in FIG. 12 with the cover 106 and the stuffer assembly 109 removed for purposes of clarity. The base 102 includes an internally threaded post 114 for receiving the stuffer screw 112. The base 102 further has slots 140 formed therein for receiving and retaining the insulation displacement contacts 116. As previously described, the base 102 includes a jack 120 for accepting a conventional RJ-11 test plug. The jack 120 provides a demarcation point to determine whether a fault exists in the service provider wiring or equipment or in the subscriber wiring or equipment. For example, if a telephone dial tone is detectable at the jack 120 and yet the subscriber does not have telephone service, then the problem is downstream from the jack 120 in the subscriber wiring or equipment. However, the jack 120 can short or otherwise fail if exposed to excessive moisture. Therefore, the jack 120 is provided with a first seal 142 that mates with a second seal 144 (shown in FIG. 2) provided on the underside of cover 106. The first seal 142 and the second seal 144 have complementary surfaces that produce a watertight seal, and thereby prevent moisture from entering the jack 120, for example, if the line module 100 is submerged in a flood condition. The plug 118 floats on the cover 106 due to the resiliency of the second seal 144. Similarly, the plug 118 may float within the jack 120 due to the resiliency of the fist seal 142. Accordingly, the first seal 142 and the second seal 144 naturally align when the plug 118 is inserted into the jack 120. As a result, the manufacturing tolerance required for the distance between the hinge arms 145 and the plug 118 may be increased, thereby reducing manufacturing cost. In other words, the plug 118 does not have to be rigidly affixed to the underside of the cover 106. Thus, the plug 118 can shift slightly to ensure a secure, watertight seal when the plug 118 enters the jack 120.

It should be noted that the line module 100 shown and described herein utilizes insulation displacement contacts to terminate both the service provider wiring and the subscriber wiring. As a result, the electrical connections can be effectively sealed from the deleterious effects of vibration, shock, and in particular, moisture, in a known manner using a commercially available grease or gel sealant. Furthermore, the telescoping action of the floating plug 118 effectively seals the test contacts located within the jack 120 when the plug is inserted into the jack. Accordingly, the entire line module 100 may be sealed against exposure to excessive moisture, such as may occur if the line module is submerged in a flood condition. In addition, the use of stuffer 108 and removable cover 106 having locking slide 110 and movable clasp 128 permits a subscriber to deter unauthorized access to the customer bridge 104 of the line module 100, while at the same time permitting a craftsperson dispatched by the service provider access to the customer bridge 104. The clasp 128 also provides a visual indication that an unauthorized person has attempted to gain access to the jack 120 provided on the customer bridge 104 of the line module 100.

While the invention has been shown in only one of its forms, it should be apparent to those skilled in the art that it is not so limited, but is susceptible to various changes without departing from the scope of invention. Accordingly, it is intended that the appended claims encompass any alternative embodiments of the invention not disclosed herein that are within the ordinary skill of a person knowledgeable in the art of terminating devices.

That which is claimed is:

1. A terminating device comprising;
   a base;
   a customer bridge attached to the base, the customer bridge housing at least one insulation displacement contact therein and having at least one wire insertion hole formed therein for electrically connecting subscriber wiring to the terminating device;
   a stuffer assembly mounted to the base, the stuffer assembly having at least one insulation displacement contact for electrically connecting service provider wiring to the terminating device; and
   a cover attached to the customer bridge and rotatable between a closed position and an opened position, the cover comprising a locking slide having a movable clasp, the movable clasp having a lower portion positioned adjacent the stuffer assembly that is broken off when an unauthorized person moves the cover from the closed position to the opened position and thereby provides a visual indication that the unauthorized person has attempted to gain access to the customer bridge.

2. A terminating device according to claim 1, wherein the customer bridge further has at least one actuating arm disposed therein that is movable between a disconnected position in which the subscriber wiring is not electrically connected to the insulation displacement contact housed within the customer bridge and a connected position in which the subscriber wiring is electrically connected to the insulation displacement contact housed within the customer bridge.

3. A terminating device according to claim 1, wherein the clasp has an opening for receiving a subscriber lock.

4. A terminating device according to claim 1, further comprising a jack mounted on the base and wherein the cover comprises a plug that engages the jack when the cover is in the closed position.

5. A terminating device according to claim 4, wherein the jack has a resilient seal thereabout and the plug has a mating resilient seal thereabout so that the plug is movable on the cover relative to the jack and thereby produces a watertight seal when the cover is in the closed position.

6. A terminating device according to claim 4, wherein the jack has a resilient seal thereabout and the plug has a mating resilient seal thereabout so that the plug is movable on the cover relative to the jack and thereby increases the manufacturing tolerance of the distance between the plug and a predetermined location on the cover.

7. A terminating device according to claim 1, wherein the stuffer assembly comprises an internally threaded post affixed to the base, a stuffer positioned over the post, at least one wire insertion passage formed in the stuffer for receiving the subscriber wiring, and an externally threaded stuffer screw that engages the post to drive the stuffer between a disconnected position and a connected position.

8. A terminating device according to claim 7, wherein the insulation displacement contact of the stuffer assembly is positioned on the base at an angle relative to the wire insertion passage.

9. A terminating device according to claim 7, wherein the stuffer assembly further comprises at least one test port for verifying the integrity of the electrical connection between the insulation displacement contact and the subscriber wiring.

10. A terminating device comprising:
   a base;
   a customer bridge attached to the base, the customer bridge housing at least one insulation displacement contact therein and having at least one wire insertion hole formed therein for electrically connecting subscriber wiring to the terminating device; and
   a cover attached to the customer bridge and movable between a closed position and an opened position, the cover comprising a locking slide having a movable clasp;
   wherein the movable clasp has a lower portion that is broken off when an unauthorized person moves the cover from the closed position to the opened position and thereby provides a visual indication that the unauthorized person has attempted to gain access to the customer bridge.

11. A terminating device according to claim 10, wherein the clasp has an opening for receiving a subscriber lock.

12. A terminating device according to claim 10, further comprising a jack mounted on the base and wherein the cover comprises a plug that engages the jack when the cover is in the closed position.

13. A terminating device according to claim 12, wherein the jack has a resilient seal thereabout and the plug has a mating resilient seal thereabout so that the plug is movable on the cover relative to the jack and thereby produces a watertight seal when the cover is in the closed position.

14. A terminating device according to claim 12, wherein the jack has a resilient seal thereabout and the plug has a mating resilient seal thereabout so that the plug is movable on the cover relative to the jack and thereby increases the manufacturing tolerance of the distance between the plug and a predetermined location on the cover.

15. A terminating device according to claim 10, wherein the customer bridge further has at least one actuating arm disposed therein that is movable between a disconnected position in which the subscriber wiring is not electrically connected to the insulation displacement contact housed within the customer bridge and a connected position in which the subscriber wiring is electrically connected to the insulation displacement contact housed within the customer bridge.

16. A terminating device according to claim 10, further comprising a stuffer assembly mounted to the base, the stuffer assembly having at least one insulation displacement contact for electrically connecting service provider wiring to the terminating device.

17. A terminating device according to claim 16, wherein the stuffer assembly comprises an internally threaded post affixed to the base, a stuffer positioned over the post, at least one wire insertion passage formed in the stuffer for receiving the subscriber wiring, and an externally threaded stuffer screw that engages the post to drive the stuffer between a disconnected position and a connected position.

18. A terminating device according to claim 17, wherein the insulation displacement contact of the stuffer assembly is positioned on the base at an angle relative to the wire insertion passage.

19. A terminating device according to claim 17, wherein the stuffer assembly further comprises at least one test port for verifying the integrity of the electrical connection between the insulation displacement contact and the subscriber wiring.

20. A device for terminating service provider wiring and subscriber wiring, the device comprising:
   a base;
   a stuffer assembly mounted to the base, the stuffer assembly comprising a stuffer and a stuffer crew that drives the stuffer between a disconnected position and a connected position, the stuffer assembly having at least one insulation displacement contact for terminating the service provider wiring to the device and at least one wire insertion passage formed in the stuffer for receiving the provider wiring;
   a customer bridge attached to the base, the customer bridge housing at least one insulation displacement contact therein and having at least one wire insertion hole formed therein for terminating the subscriber wiring to the device; and
   a cover attached to the customer bridge and movable between a closed position and an opened position, the cover comprising a locking slide having a movable clasp with a lower portion that is broken off when an unauthorized person moves the cover from the closed position to the opened position and thereby provides a visual indication that the unauthorized person has attempted to gain access to the customer bridge;
   wherein the insulation displacement contact of the stuffer assembly is positioned on the base at an angle relative to the wire insertion passage.

21. A device according to claim 20, wherein the clasp has an opening for receiving a subscriber lock.

22. A device according to claim 20, further comprising a jack mounted on the base and wherein the cover comprises a plug that engages the jack when the cover is in the closed position.

23. A device according to claim 22, wherein the jack has a resilient seal thereabout and the plug has a mating resilient seal thereabout so that the plug is movable on the cover relative to the jack and thereby produces a watertight seal when the cover is in the closed position.

24. A device according to claim 22, wherein the jack has a resilient seal thereabout and the plug has a mating resilient seal thereabout so that the plug is movable on the cover relative to the jack and thereby increases the manufacturing tolerance of the distance between the plug and a predetermined location on the cover.

25. A device according to claim 20, wherein the customer bridge further has at least one actuating arm disposed therein that is movable between a disconnected position in which the subscriber wiring is not terminated to the insulation displacement contact housed within the customer bridge and a connected position in which the subscriber wiring is terminated to the insulation displacement contact housed within the customer bridge.

26. A device according to claim 20, wherein the stuffer assembly further comprises at least one test port for verifying the integrity of the electrical connection between the insulation displacement contact and the subscriber wiring.

27. A device according to claim 20, further comprising an electronics module affixed to the base and wherein the customer bridge and the stuffer assembly each comprise a dielectric sealant for sealing the insulation displacement contact of the customer bridge and the insulation displacement contact of the stuffer assembly.

28. A device according to claim 27, herein the electronics module comprises a protection element.

29. A network interface device (NID) for use in a communications network comprising:
   a line module for interconnecting service provider wiring with subscriber wiring, the line module comprising
      a base;
      a stuffer assembly mounted to the base, the stuffer assembly comprising at least one insulation displacement contact for terminating the service provider wiring;
      a customer bridge attached to the base, the customer bridge housing at least one insulation displacement contact for terminating the subscriber wiring; and
      a cover attached to the customer bridge for movement between an opened position and a closed position; and
   a lockable inner cover having a lip;
   wherein the cover of the line module comprises a sliding lock having a movable clasp, the clasp comprising a lower portion that is positioned beneath the lip of the inner cover so that the lower portion is broken off when an unauthorized person moves the cover of the line module from the closed position to the opened position.

30. A network interface device according to claim 29, wherein the line module further comprises a jack mounted on the base and wherein the cover of the line module comprises a plug that engages the jack when the cover of the line module is in the closed position, the jack having a resilient seal thereabout and the plug having a mating resilient seal thereabout.

31. A network interface device according to claim 29, wherein the line module further comprises an electronics module affixed to the base and wherein the customer bridge and the stuffer assembly each comprise a dielectric sealant for sealing the insulation displacement contact of the customer bridge and the insulation displacement contact of the stuffer assembly.

32. A terminating device for interconnecting subscriber wiring and service provider wiring comprising:
   a base;
   a customer bridge attached to the base, the customer bridge housing at least one insulation displacement contact therein and having at least one wire insertion hole formed therein for electrically connecting the subscriber wiring to the terminating device, the customer bridge having at least one actuating arm disposed therein that is movable between a disconnected position in which the subscriber wiring is not electrically connected to the insulation displacement contact housed within the customer bridge and a connected position in which the subscriber wiring is electrically connected to the insulation displacement contact; and
   a cover attached to the customer bridge, the cover having at least one opening therethrough for visually indicating whether the at least one actuating arm is in the disconnected position or the connected position.

33. A terminating device according to claim 32, further comprising:
   a telephone jack provided on the base; and
   a cover attached to the customer bridge movable between an opened position and a closed position, the cover comprising a plug that engages the telephone jack when the cover is in the closed position, the plug having a resilient seal such that the plug is movable on the cover relative to the jack to thereby produce a watertight seal when the cover is in the closed position.

34. A terminating device according to claim 32, further comprising:
   a telephone jack provided on the base; and
   a cover attached to the customer bridge movable between an opened position and a closed position, the cover comprising a plug that engages the telephone jack when the cover is in the closed position, the plug having a resilient seal such that the plug is movable on the cover relative to the jack to thereby increase the manufacturing tolerance of the distance between the plug and a predetermined location on the cover.

* * * * *